UNITED STATES PATENT OFFICE 2,524,106

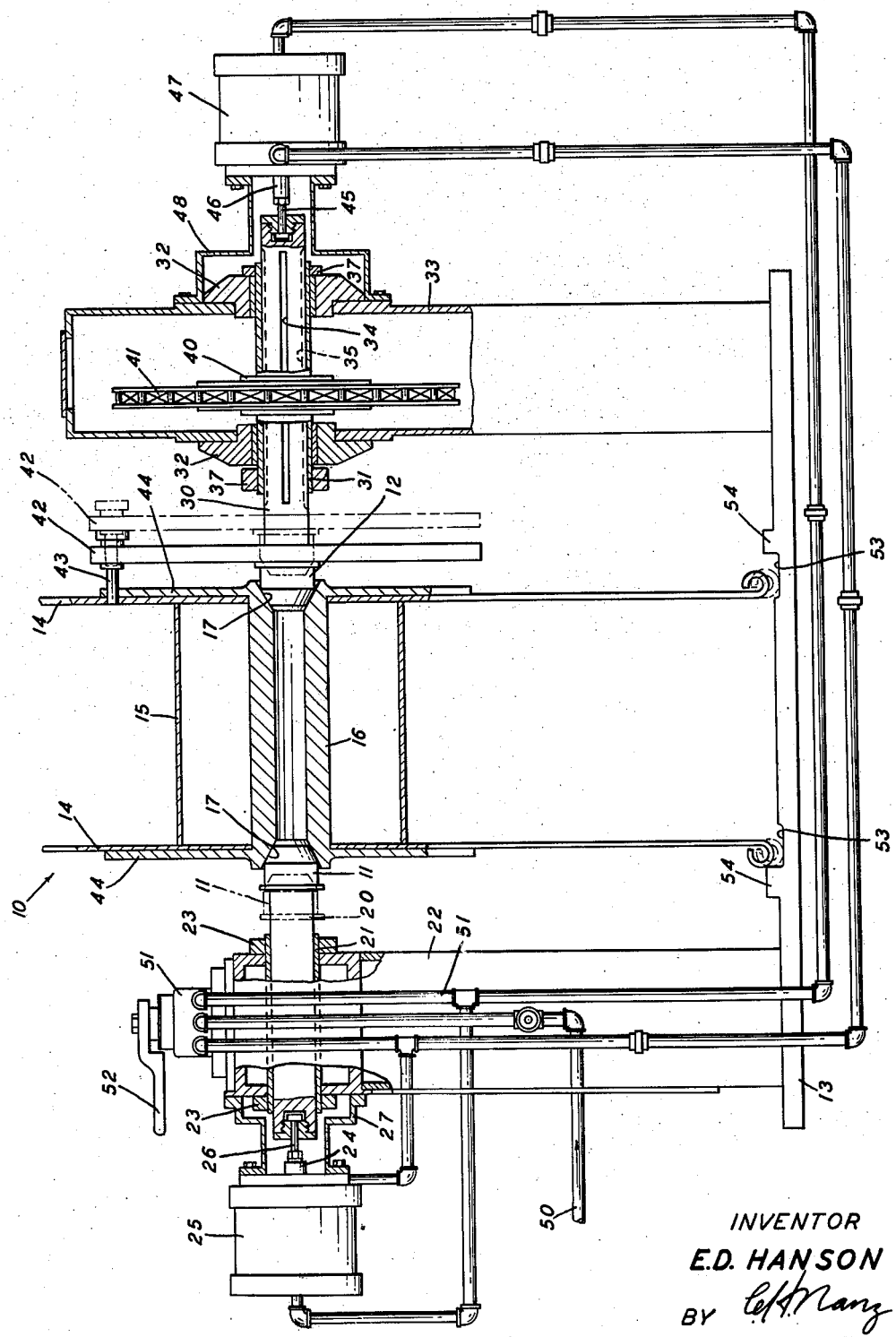

APPARATUS FOR ROTATABLY SUPPORTING REELS

Estyle D. Hanson, Baltimore, Md., assignor to Western Electric Company, Incorporated, New York, N. Y., a corporation of New York Application January 7, 1947, Serial No. 720,492

3 Claims. (Cl. 242—58)

This invention relates to apparatus for rotatably supporting reels, and more particularly to apparatus for effecting rapid and easy removal or insertion of reels in reel supporting apparatus.

In general, apparatus for supporting reels is designed to permit free rotation of the reel about its central axis so that the reel may be driven by external means to take up wire, cable or other filamentary materials, or freely rotated about its central axis as a supply reel by the withdrawal therefrom of material previously wound thereon. Obviously, such operations make it necessary from time to time to remove a full reel from the apparatus and replace it by an empty reel, or vice versa. In order to keep pace with associated apparatus used in manufacturing and handling wire, cable or the like, it is expedient that the reel supporting apparatus be capable of effecting a removal or insertion of a reel in a minimum period of time and with a minimum amount of collateral handling and manipulation of the reel.

An object of the invention is to provide new and improved apparatus for rotatably supporting reels.

Another object of the invention is to provide completely automatic means for effecting rapid and easy insertion or removal of reels in reel supporting apparatus.

In accordance with a specific embodiment of the invention, there is provided an apparatus for rotatably supporting reels which comprises a pair of movable centering members arranged in line and having tapered ends adapted to engage central apertures of a reel to be supported thereby, and fluid pressure means arranged to impart simultaneous but oppositely directed axial movement to the centers, whereby the centering members may be caused to selectively engage or disengage the reel apertures, without the need of any collateral handling of the reel.

A complete understanding of the invention will be had from the following detailed description, when read in conjunction with the appended drawing, in which the single figure is a vertical, partially sectional view of an apparatus forming a specific embodiment of the invention.

Referring now to the drawing, it will be noted that a reel 10 is shown supported in its normal running position by tapered centering members 11 and 12, that is, the reel is raised sufficiently above a loading base 13 to permit free rotation of the reel about its central axis. While the reel 10 may be of any suitable design, a convenient form, as illustrated in the drawing, comprises a pair of heads 14—14 spaced apart by a winding drum 15 and a central hub 16 for holding the heads and drum together and provided with conical bores 17—17 at the extremities thereof. Reels, like the reel 10, are adapted to receive cable, wire or other filamentary materials and the apparatus to be hereinafter described serves to support the reel 10 so that it may be freely rotated about its central axis, whereby the reel may be driven by external means and act as a takeup reel or may be freely rotated as a supply reel by the withdrawal of the filamentary material previously wound thereon.

The tapered centering member 11 is rotatably mounted on one end of a cylindrical arbor 20 slidably positioned in a sleeve 21 secured in the upper end of an upright support 22 secured to the base 13 by means of collars 23—23 secured on the extremities of the sleeve. A piston rod 24 secured to a piston (not shown) forming part of an air cylinder 25, is connected to the opposite end of the arbor 20 by a rod 26. The air cylinder 25 is secured to the support 22 by means of a hollow bracket 27. The centering member 12 is secured on the end of a cylindrical arbor 30 slidably positioned in a sleeve 31, which sleeve is rotatably mounted in a pair of horizontally aligned bearings 32—32 secured on opposite sides of a hollow, box-like, support 33 mounted in an upright position on the base 13. The arbor 30 is provided with a plurality of splines, such as a spline 34, around the periphery thereof, which splines engage a splined bore 35 of the sleeve 31. This spline arrangement between the arbor 30 and the sleeve 31 provides free axial movement of the arbor 30 with respect to the sleeve, whereas the sleeve and the arbor are thereby keyed together and rotate as a unit in the bearings 32—32.

A sprocket 40 is keyed on a portion of the sleeve 31 positioned within the support 33 and is engaged by a roller chain 41 which may be connected to suitable driving means (not shown), whereby the sleeve and arbor may be driven as a unit. An annular plate 42 is secured centrally on the arbor 30 adjacent to the centering member 12, and is provided with a spring pin 43 adjacent to its periphery, which pin engages a suitable aperture provided in a flange 44 formed integrally with the hub 16 of the reel 10. Therefore, when the pin 30 is being driven by the sprocket and chain 40 and 41, respectively, the reel 10 is driven in the same direction by the pin 41 which engages the aperture provided in the flange 44 of the reel. A rod 45 has one end thereof rotatably mounted in the opposite end of the arbor 30, and the other end thereof secured to a piston rod 46 secured to a piston (not shown) forming part of a conventional air cylinder 47 rigidly mounted to the support 33 by a hollow bracket 48.

A pipe 50 serves to direct compressed air from a suitable supply source (not shown) to a conventional four-way valve 51 secured on the top of the support 22. The valve 51 is provided with an operating lever 52, by means of which the compressed air supplied thereto by the pipe 50 is directed to the air cylinders 25 and 47 by suitable piping so that the arbors 20 and 30 and their respective centering members 11 and 12 are caused to simultaneously move toward each other or away from each other, depending upon the direction in which the lever 52 is actuated. A pair of spaced arcuate-shaped grooves 53—53 are provided in the base 13 so that the center of the grooves is in the same plane with the common axis of the arbors, located above the base 13 a distance substantially less than the radius of the reel 10. By virtue of this design of the grooves, when the reel is rolled on into the grooves the heads of the reel will contact only the extremities of the grooves whereby the central axis of the reel is aligned with the common axis of the centering members. A projection 54 is provided on the base 13 adjacent to each groove 53 for the purpose of preventing excessive lateral movement of the reel 10 during the period in which the centering members 11 and 12 are engaging or disengaging the conical apertures 17—17 of the reel.

In the operation of the above-described apparatus, let it be assumed that the operating lever 52 of the four-way valve 51 is positioned so that the air cylinders 25 and 47 have caused the arbors 20 and 30 and the centering members 11 and 12 to be retracted to their broken line positions shown on the drawing. With the centers in this position, the reel 10, which may be empty or loaded depending upon the operation to be performed by the apparatus, is rolled onto the base 13 until it is properly seated in the grooves 53—53, whereupon the central axis of the reel is in the same plane with the common axis of the centers 11 and 12. When the reel 10 is in this position on the base 13, the common axis of the centering members 11 and 12 passes through the central apertures 17—17 provided in the extremities of the hub 16 of the reel 10 but above the running or central axis of the reel.

Having positioned the reel on the base 13 as described, the lever 52 of the valve 51 is actuated to admit air to the air cylinders 25 and 47 so that their respective centering members 11 and 12 are urged inwardly toward the ends of the reel 10. As the centering members 11 and 12 continue to move toward each other, the action of the tapered ends thereof in engaging the conical bores 17—17 serves to lift the reel 10 clear of the base 13 and to position the reel so that its axis of rotation is now aligned with the common axis of the centers 11 and 12. After the reel 10 has been placed in this position by the axial movement of the centering members 11 and 12, it is now in a position to be freely rotated about its axis as a supply reel or driven as a takeup reel by external driving means connected to the gear 40 by the chain 41.

In either case, when the particular reeling operation has been completed, it then is necessary to remove the reel from the apparatus. To effect a removal of the reel from the apparatus, the lever 52 of the valve 51 is actuated to admit air to the opposite ends of the air cylinders 25 and 47, whereby the arbors 20 and 30 and their respective centering members 11 and 12 are caused to be withdrawn from the conical bores 17—17 of the reel 10. In other words, the centering members 11 and 12 are caused to move along a common axis away from each other, and in so doing, the action between the tapered ends thereof and the conical bores serves to lower the reel gently to rest on the base 13 and position the heads 14—14 thereof in their respective grooves 53—53. The centering members 11 and 12 continue to move away from each other until they are entirely clear of the ends of the reel, whereupon the reel 10 may be rolled off of the base 13 in order that another reel may be positioned on the base 13 and placed in a freely rotatable manner between the supports 22 and 33, as described hereinabove.

The projections 54—54 provided on the base 13 adjacent to the grooves 53—53 prevent excessive lateral movement of the reel 10 when the centering members 11 and 12 are engaging or disengaging the conical bores 17—17, as the case may be. The projections 54—54 also serve to hold the reel 10 in proper position between the supports 22 and 33 so that, if one of the arbors is slower getting started than the other, the first centering member to engage the reel will cause the reel to move laterally until the opposite head engages the adjacent projection 54. By the time the reel has moved to this position, the slower moving arbor has now reached a position where its centering member engages the respective conical bore of the reel and continued movement thereafter of both of the arbors serves to lift the reel 10 clear of the base 13 and position it so that its central axis is aligned with the common axis of the centering members 11 and 12.

It should be noted that since the centering members 11 and 12 have their ends tapered and since conical bores 17—17 are provided in the extremities of the hub 16, the action of the tapered centers within the conical bores serves to automatically align the rotating axis of the reel with the common axis of the centering members. In addition, the provision of tapered ends on the centering members and conical bores in the reel to be supported, serves to provide the apparatus with a greater lifting advantage than could be obtained if one or both of these features were omitted from the apparatus. That is, the apparatus may be designed so that the central axis of the reel, when positioned on the base 13, may be substantially below the common axis of the centering members, whereby greater lift of the reel may be obtained when the centering members lift the reel to its rotatable position between the spaced supports.

What is claimed is:

1. An apparatus for rotatably supporting reels, which comprises a pair of spaced supports, a centering member carried by each support so as to be movable along a common axis with respect to said supports, the juxtaposed ends of said centering members being tapered to engage central apertures of a reel to be rotatably supported by said supports, a base for supporting a reel between said spaced supports, means provided on the base member for positioning the reel thereon so that the common axis of the centering members is in the same vertical plane but slightly above the central axis of the reel, means provided on one of said centering members for driving the centering member by externally disposed driving means, means provided adjacent to the tapered end of the drivable centering member for engaging the adjacent flange of reel positioned on the centering members so that the reel is rotated when the centering member is rotated, an air cylinder positioned adjacent to the end of each centering member for moving the centering member along the common axis of the supports, means for controlling the operation of the air cylinder to obtain simultaneous but oppositely directed axial movement of the centering members, whereby the centering members may be urged inwardly to engage the central apertures of the reel and lift the reel from the supporting means to its running position or lower the reel from its running position to the base.

2. An apparatus for rotatably supporting reels, which comprises a pair of centering members carried by said supports and arranged to move along a common axis with respect to said supports, the juxtaposed ends of said centering members being tapered to engage central apertures of a reel to be rotatably supported between said supports, a base member for supporting a reel between said centering members so that the common axis of the centering members passes through the central apertures of the reel but slightly above the central axis thereof, an air cylinder mounted on each support adjacent to the end of each centering member for moving a centering member along the common axis, a manually operable valve arranged to control the operation of the air cylinders so as to obtain simultaneous but oppositely directed axial movement of the centering members whereby the centering members may be caused to engage the central apertures of a reel and lift the reel from the base member to its running position or lower the reel from its rotatable position to the base member, and means provided on the base member for preventing the lateral movement of the reel while the centering members are moving into or out of engagement with the central apertures of the reel.

3. An apparatus for rotatably supporting reels, which comprises a pair of spaced supports, a pair of centering members carried movably by the supports, the ends of said centering members being tapered to engage central apertures of a reel to be supported by said supports and being juxtaposed, a base member for supporting a reel between said spaced supports, means provided on the base member for positioning the reel thereon so that the common axis of the centering members passes through the central aperture of the reel but slightly above the central axis thereof, a pair of air cylinders mounted on the supports adjacent to the centering members thereon for imparting axial movement to the centering members, a manually-operable valve for selectively actuating the air cylinders to move the centering members simultaneously into engagement with the central apertures of the reel and lift the reel from the base member to its rotatable position and simultaneously out of engagement with the central apertures of the reel and lower the reel from its rotatable position to the base member, means provided on the base member for preventing lateral movement of the reel while the centering members engage and disengage the central apertures of the reel, means for rotating one of the centering members, and means provided on the last-mentioned centering member for locking a reel positioned on the centering members for rotation therewith.

ESTYLE D. HANSON.

REFERENCES CITED

The following references are of record in the file of this patent:

UNITED STATES PATENTS

| Number | Name | Date |
| --- | --- | --- |
| 1,378,305 | Nordfors et al. | May 17, 1921 |
| 2,163,010 | Richards et al. | June 20, 1939 |
| 2,346,948 | Shackelford et al. | Apr. 18, 1944 |